(12) United States Patent
Davidian et al.

(10) Patent No.: US 6,962,656 B2
(45) Date of Patent: Nov. 8, 2005

(54) LIQUID RECONDITIONING SYSTEM INCLUDING A VENTURI PUMP

(75) Inventors: Steven Davidian, Chagrin Falls, OH (US); Christopher Fenn, Hudson, OH (US)

(73) Assignee: Zebra Skimmers Corp., Solon, OH (US)

( * ) Notice: Subject to any disclaimer, the term of this patent is extended or adjusted under 35 U.S.C. 154(b) by 111 days.

(21) Appl. No.: 10/733,044

(22) Filed: Dec. 11, 2003

(65) Prior Publication Data

US 2004/0118774 A1 Jun. 24, 2004

Related U.S. Application Data

(60) Provisional application No. 60/433,212, filed on Dec. 13, 2002.

(51) Int. Cl.[7] .............................................. B01D 17/025
(52) U.S. Cl. ................. 210/172; 210/195.1; 210/257.1; 210/523; 210/532.1; 210/538
(58) Field of Search .............................. 210/172, 195.1, 210/257.1, 258, 523, 532.1, 538, 540

(56) References Cited

U.S. PATENT DOCUMENTS

| | | | | |
|---|---|---|---|---|
| 3,262,571 A | * | 7/1966 | Petretti ....................... 210/540 |
| 4,132,645 A | * | 1/1979 | Bottomley et al. ......... 210/540 |
| 4,252,649 A | * | 2/1981 | Favret, Jr. ................... 210/538 |
| 5,059,312 A | * | 10/1991 | Galletti ....................... 210/540 |
| 5,236,585 A | * | 8/1993 | Fink ............................ 210/538 |
| 5,378,376 A | * | 1/1995 | Zenner ....................... 210/540 |
| 5,405,538 A | * | 4/1995 | Batten ........................ 210/540 |
| 5,454,937 A | * | 10/1995 | Lewandowski ............. 210/540 |
| 5,948,244 A | * | 9/1999 | Fortier ..................... 210/532.1 |
| 6,491,830 B1 | * | 12/2002 | Batten et al. ............... 210/540 |
| 2002/0185458 A1 | * | 12/2002 | Portman ..................... 210/523 |

* cited by examiner

*Primary Examiner*—Christopher Upton
(74) *Attorney, Agent, or Firm*—Pearne & Gordon LLP

(57) ABSTRACT

A liquid reconditioning system separates mixtures of two liquids that are insoluble in one another, such as a coolant and tramp oil from a machining operation. The mixtures of the two liquids are delivered from a sump, or collection basin, to a separator by means of a venturi pump. A tank is provided for holding the two liquids after they are separated whereby they may be individually removed from the holding tank. One of the separated liquids, in the case of a coolant and tramp oil, the coolant, is pumped through the venturi pump to create the vacuum, or negative pressure, that draws the mixtures of the two liquids from the sump to the separator.

5 Claims, 2 Drawing Sheets

LIQUID RECONDITIONING SYSTEM INCLUDING A VENTURI PUMP

This application claims the benefit of U.S. Provisional Application Ser. No. 60/433,212, filed Dec. 13, 2002.

BACKGROUND OF THE INVENTION

1. Field of the Invention

The present invention is directed, in general, to reconditioning systems for removing contaminants from a liquid and, more particularly, to reconditioning systems for removing tramp oil from coolants used in machining operations.

2. Description of Related Art

Typically, machining operations use coolants in the manufacture of parts in order to minimize the accumulation of heat energy in the part being machined and the cutting tool and in order to maintain the cutting effectiveness of the cutting tool during the machining process. As the coolant is applied to the machining process, it collects and mixes with, for example, cutting oils, lubricants, way oils, mill oils, hydraulic fluids, and other materials with which the coolant is not soluble. These materials are collectively referred to as tramp oil. Because the presence of the tramp oil in the coolant is detrimental to the properties of the coolant that enhance cutting and cooling, removal of the tramp oil from the coolant is essential. Consequently, the tramp oil and coolant mixtures are collected in a sump for the purpose of reconditioning the coolant so that the coolant can be reused.

When a coolant contaminated with tramp oil is held in a sump, the two fluids will segregate to some extent because the coolant has a specific gravity greater than the specific gravity of the tramp oil. Typically what occurs is that uncontaminated coolant, or coolant containing only very small amounts of tramp oil, settles and collects in a layer at the bottom of the sump while a layer of coolant significantly contaminated with tramp oil collects at the top of the sump on top of the layer of uncontaminated coolant. Conventionally, skimmers are used to recondition the coolant by removing the tramp oil from the coolant. Tramp oil skimmers, generally, fall within one of four classes: disk skimmers; belt skimmers; mop, or rope skimmers; and weir skimmers.

Disk skimmers, ordinarily, include a disk mounted on a rotating shaft near the surface near the surface of the liquid in the sump. The disk will pass both above and through the tramp oil layer as the shaft rotates. When the disk passes through the tramp oil layer, the tramp oil is collected on the outer surface of the disk. Blades or wipers remove the tramp oil from the disk when the disk passes above the surface of the liquid. Disk skimmers are inefficient in removing tramp oil from a coolant, however, and require a relatively calm surface and unchanging liquid level in the sump.

A belt skimmer removes tramp oil from the coolant in a sump by the operation adsorbed of a partially submerged belt. The oil is adsorbed by the belt as the belt is driven through the tramp oil layer at the top of the sump. As the belt, with the adsorbed tramp oil, passes over a collection tank, the tramp oil is removed from the belt into a collection tank. Belt skimmers, typically, are large machines, usually more than three feet in height, and are unacceptable for use in most conventional machine tool operations.

Mop or rope skimmers use a plurality of adsorbent fibers, or filaments, to which tramp oil has a tendency to cling. The fibers are placed on the surface of a conveyor belt, and, as the belt passes through the tramp oil layer, the fibers are brought into contact with the tramp oil. When this contact occurs, the fibers adsorb, or cling to, and soak-up the tramp oil. The fibers are then compressed in a series of rollers, and the tramp oil is forced from the fibers into a collection tank. One inefficiency of a mop or rope skimmer, among others, is that the fibers will contact and absorb coolant, as well as tramp oil, if the depths of the layers of the tramp oil and the coolant in the sump vary.

Weir skimmers have an overflow weir that floats at the rim of the sump, allowing the layer of the coolant contaminated with tramp oil at the surface of the liquid in the sump to fall into the center of the sump. Because of the difference in the specific gravities of the coolant and the tramp oil, the coolant will collect at the bottom of the center of the sump. Weir skimmers are not particularly efficient when a heavy tramp oil must be removed from a cold coolant because the specific gravities of the two fluids will not be significantly different, and the tramp oil will be quite viscous. Furthermore, when waves are present at the surface of the fluid in the sump, the efficiency of the weir skimmer decreases due to excess coolant cresting over the annular overflow weir.

In addition to the weir skimmer, other skimmers exist that employ pumps for pumping a coolant, tramp oil, or a combination of a coolant and tramp oil as part of the reconditioning process. Centrifugal pumps are preferred for this application because of the high flow rates achievable with such pumps and because of their low cost. A conventional centrifugal pump includes a set of rotating vanes, enclosed within a housing, that transmits energy to a fluid through centrifugal force. The vanes are formed as part of an impeller and extend radially from, generally, the center to the outer periphery of the impeller. The fluid to be pumped enters the vanes near the center of the impeller and is forced outwardly toward the pump housing by the centrifugal force generated by the rotation of the impeller. The maintenance of a small clearance between the impeller and the housing is required for the satisfactory operation of the pump. However, this small clearance and the high angular velocity of the impeller impart a large shear force to the fluid being pumped. This large shear force causes the formation of emulsions of tramp oil and coolant having very small droplet sizes. Such emulsions are difficult and expensive to separate.

To avoid the formation of emulsions caused by the use of centrifugal pumps, diaphragm pumps have been developed for the purpose of transporting the fluids involved. Diaphragm pumps transport fluids by the operation of a flexible diaphragm that creates a pumping pressure by, repeatedly, altering the volume of a pumping chamber. Diaphragm pumps impart a much lesser shear force to fluids in the pump than centrifugal pumps; however, diaphragm pumps, typically, can pump only a small volume of fluid, cannot be used for high-pressure applications, and are costly to operate due to the frequent failure of the diaphragms and the high maintenance costs required.

Accordingly, there is a need in the art for a coolant reconditioning system which efficiently removes tramp oil from a coolant, minimizes the formation of emulsions between the tramp oil and the coolant, is convenient to use in conventional machining operations, and is economical.

SUMMARY OF THE INVENTION

In accordance with one aspect, the present invention comprises a liquid reconditioning system for removing tramp oil from a mixture of the tramp oil and a coolant. The reconditioning system includes a sump, or collection basin, for collecting mixtures of the coolant and tramp oil from a machining operation; an in-sump pickup unit that is connected to a first fluid conductor through which the coolant and tramp oil mixtures are drawn from the sump by a venturi pump to a separator that separates the coolant from the tramp oil with which it is mixed; a holding tank for holding the coolant that has been reconditioned and the tramp oil that has been separated from the coolant; a return fluid conductor connected to the holding tank through which reconditioned coolant flows from the holding tank back to the sump; and a pump that forces reconditioned coolant from the holding tank through the venturi pump creating a negative pressure, or vacuum, in the venturi pump, causing the coolant and tramp oil mixtures to be drawn from the sump through the first fluid conductor. The separator includes a coalescing cartridge through which the coolant and tramp oil mixtures flow. Coalescing media are contained within the coalescing cartridge, and the tramp oil is separated from the coolant by the tramp oil coalescing on the coalescing media, thereby reconditioning the coolant. The separated coolant and tramp oil then settle out in separate layers in the holding tank.

In accordance with another aspect, a liquid reconditioning system has a separator for separating a mixture of first and second liquids that, essentially, are not soluble in one another. The separator is provided with an inlet for receiving fluids. A holding tank is in fluid communication with the separator for receiving and holding the separated first and second liquids from the separator whereby, because of the difference in their specific gravities, the second liquid collects in the holding tank above the first liquid. The reconditioning system also includes a sump for collecting mixtures of the first and second liquids, and the sump is provided with an outlet for passing the mixtures of the first and second liquids. Also included in the reconditioning system is a venturi pump that has first and second inlets and an outlet for passing fluids. A first fluid conductor is connected at one end to the first inlet in the venturi pump, and, at its other end, the first fluid conductor is connected to the outlet of the sump for conveying to the venturi pump from the sump mixtures of the first and second liquids. A conduit is connected at one end to the outlet of the venturi pump, and, at its other end, the conduit is connected to the inlet at the separator for conveying to the separator fluids exiting the venturi pump. A pumping means having an outlet for passing fluids is in fluid communication with one of the first and second liquids in the holding tank for pumping the liquid with which it is in fluid communication. A second fluid conductor is connected at one end to the second inlet of the venturi pump, and, at its other end, the second fluid conductor is connected to the outlet of the pumping means for conveying to the venturi pump the liquid that is pumped by the pumping means. Passageways are provided within the venturi pump for conveying from the second inlet of the venturi pump to the outlet of the venturi pump the liquid pumped by the pumping means to the venturi pump. The passageways are in fluid communication with the first inlet in the venturi pump and have configurations such as to establish a negative pressure in the first inlet of the venturi pump when the liquid pumped by the pumping means to the second inlet of the venturi pump passes from the second inlet of the venturi pump to the outlet of the venturi pump. This negative pressure causes mixtures of the first and second liquids in the sump to be drawn from the sump through the first fluid conductor into the venturi pump through the first inlet and from where the mixtures are passed to the separator along with the one of the first and second fluids pumped by the pumping means.

BRIEF DESCRIPTION OF THE DRAWINGS

The foregoing and other features and advantages of the present invention will become apparent to those skilled in the art to which the present invention relates upon reading the following description with reference to the accompanying drawing, in which.

DETAILED DESCRIPTION OF AN EMBODIMENT OF THE INVENTION

Certain terminology is used herein for convenience only and is not to be taken as a limitation on the present invention. For example, the term "coolant" should be understood to include not only a coolant used to perform a cooling function and enhance the cutting operation during a machining process but also to include other fluids used in machining processes, such as wash fluids, for example, that facilitate the machining process, can collect liquid contaminants and can be advantageously reconditioned. Additionally, the phrase "tramp oil" is used, generally, to refer to any fluid, other than a coolant, that may contaminate the coolant during the machining process. Examples of tramp oils are cutting oils, lubricants, way oils, mill oils, hydraulic fluids, and other fluids that are not soluble in the coolant. Additionally, the term "fluid" is used, generally, to refer to any liquid, including a mixture of a coolant and a tramp oil.

Figure 2:
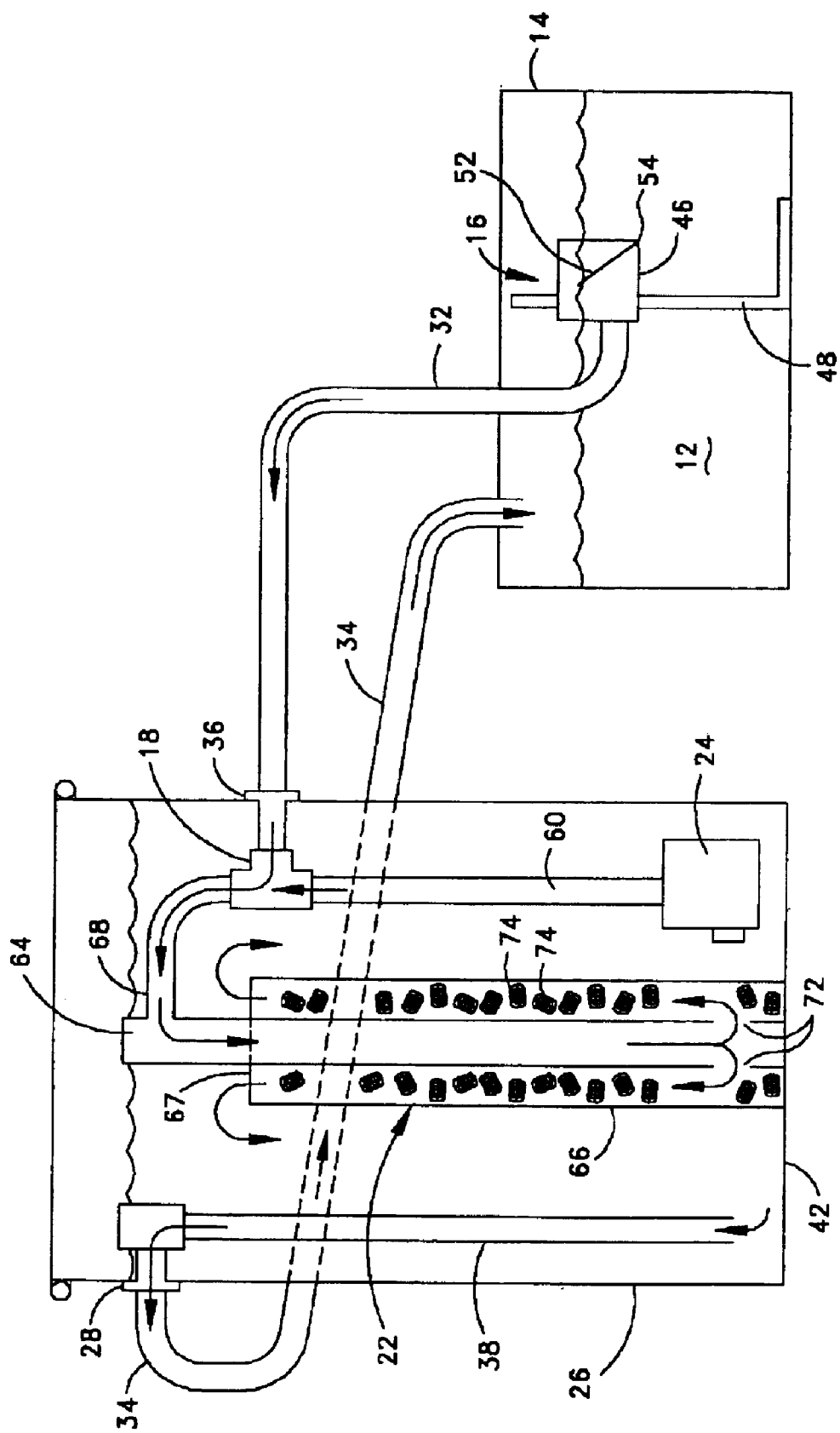
FIG. 2 is a cut-away view that schematically illustrates a fluid reconditioning system in accordance with the present invention.

In the drawing, FIG. 2 illustrates a liquid reconditioning system in the form of a coolant reconditioning system that separates a first liquid, in this case a coolant, from a mixture of the coolant and a second liquid that comprises tramp oil. The arrows in FIG. 2 indicate the directions of flow of the various liquids that are involved in the reconditioning process. The separation of the coolant and tramp oil, which, essentially, are not soluble within one another, takes place in a separator that is in fluid communication with a holding tank for receiving and holding the separated first and second liquids from the separator. In the embodiment of FIG. 2, the separator, or filter, indicated generally at 22, is located in a holding tank 26. A sump 14 collects mixtures of the coolant and tramp oil from a machining operation. Because the coolant has a higher specific gravity than the tramp oil, near the bottom of the sump 14, the fluid 12 in the sump will consist, essentially, of only the coolant while the liquid at the top of the sump will consist of a mixture of the coolant contaminated with a high concentration of the tramp oil. As set forth in greater detail below, the mixture of the coolant and the tramp oil from the top of sump 14 is conveyed to the separator 22 where the coolant is reconditioned by the removal of the tramp oil from the coolant, and the reconditioned coolant is returned back to the sump 14 where it collects at the bottom of the sump. The entire process, essentially, is a continuous one. In other words, as mixtures of the coolant and tramp oil are conveyed to the separator and the reconditioning of the coolant takes place, tramp oil will continue to be collected in the sump 14 from the machining operation.

The coolant reconditioning system includes an in-sump pickup assembly, indicated generally at 16, and a venturi pump 18. The in-sump pickup assembly 16 serves as an outlet for the sump 14 for passing fluids from the sump. Mixtures of the coolant and tramp oil are conveyed to the venturi pump 18 through a first fluid conductor 32 that is connected at one end through a flanged sleeve 36 to a first inlet in the venturi pump and is connected at its other end to assembly 16. A return fluid conductor 34 provides fluid communication between the interior of the holding tank 26 and the sump 14 through an outlet in the holding tank 26 in the form of the flanged sleeve 28 which is attached to the tank. The return fluid conductor 34 is connected at one end to the flanged sleeve 28, and its other end is disposed at the sump for returning coolant to the sump. The first liquid conductor 32 and the return fluid conductor 34 are secured to the flanged sleeves 36 and 28, respectively, by any suitable means, and the conductors are formed from a material that is flexible and resistant to damage by the tramp oil and the coolant.

The holding tank 26, which is generally cylindrical in shape, holds the coolant and the tramp oil that have been separated in the separator 22. The coolant, having a greater specific gravity than the tramp oil, will collect toward the bottom of the tank 26 and the tramp oil will collect in a layer above the coolant.

A conduit 38 is positioned within the tank 26 so that its open end is disposed near the bottom 42 of the tank 26 where the reconditioned coolant has settled. Consequently, the conduit 38 will act as a means for conveying the coolant to the flanged sleeve outlet 28 in the tank 26 by accepting reconditioned coolant through its open end. The reconditioned coolant will rises in the conduit 38 and pass out the of the tank 26 through the flanged sleeve 28 into conduit 34. The reconditioned coolant then flows by gravity through return fluid conductor 34 to the sump 14. Tramp oil in the upper portion of the tank 26 is removed periodically in any suitable manner such a through a discharge valve (not shown) mounted in the wall of the tank near the top of the tank.

The in-sump pickup assembly 16 includes a skimmer 46 adjustably secured to a stand 48 that is supported on the bottom of the sump 14. The skimmer 46 is a hollow, generally, cube-shaped structure having an adjustable opening at one side in the form of a door 52 pivotally mounted at the bottom edge of the opening by a horizontal hinge 54. The door 52 is adjustable between a fully closed position and a fully opened position. The fluid conductor 32 is connected at one end to the skimmer 46 and at its other end to the flanged sleeve 36, thereby providing fluid communication between the sump 14 and the venturi pump 18. A chip filter (not shown) is located within skimmer 46 to prevent the passage of foreign solids from the sump 14 into the fluid conductor 32.

The door 52 of the skimmer 46 is not subjected to any sort of biasing force; consequently, the door is free to pivot about the hinge 54 between a fully open, or horizontal, position inwardly of the skimmer 46 and a fully closed, or vertical, position. When the in-sump pickup assembly 16 is placed in the sump 14, the height of the skimmer 46 is adjusted on the stand 48 so that the skimmer 46 is only partially submerged in the fluid 12 in the sump 14. The buoyant force of the fluid 12 in the sump 14 controls the extent to which the door 52 will be opened so that the top edge of the door 52 adjusts to the level of the fluid in the sump and allow only the very upper-most portion of the fluid 12, or the most contaminated coolant, to enter the skimmer 46 and be conveyed to venturi pump 18 through fluid conductor 32. As will be understood, the level of the fluid 12 in sump 14 will vary somewhat depending on the relative rates at which fluid from the sump 14 is delivered to the venturi pump 18, mixtures of coolant and tramp oil are collected in sump 14 from the machining operation and reconditioned coolant is returned to the sump. In general, it has been found that it will be adequate if the in-sump pickup assembly 16 can accommodate fluctuations in the fluid level of approximately three to four inches.

According to another embodiment of the present invention, the in-sump pickup assembly comprises a floating skimmer (not shown) that is, generally, T-shaped, i.e., the skimmer has a cross member and an intersecting member that intersects the cross member at substantially the midpoint of the cross member. The cross member and intersecting member have interior passageways that are in communication with one another. The cross member has openings into its passageway at its opposite ends. A floatation device encircles the cross member of the skimmer. In this embodiment, the fluid conductor 32 is connected to the free end of the intersecting member and mixtures of coolant and tramp oil in the sump 14 enter the openings in the cross member and pass through the intersecting member into the conduit 32 from where the mixtures are delivered to the venturi pump 18. A floating skimmer of this type can accommodate fluctuations in the level of the fluid in the sump of approximately 12 inches.

Figure 1:
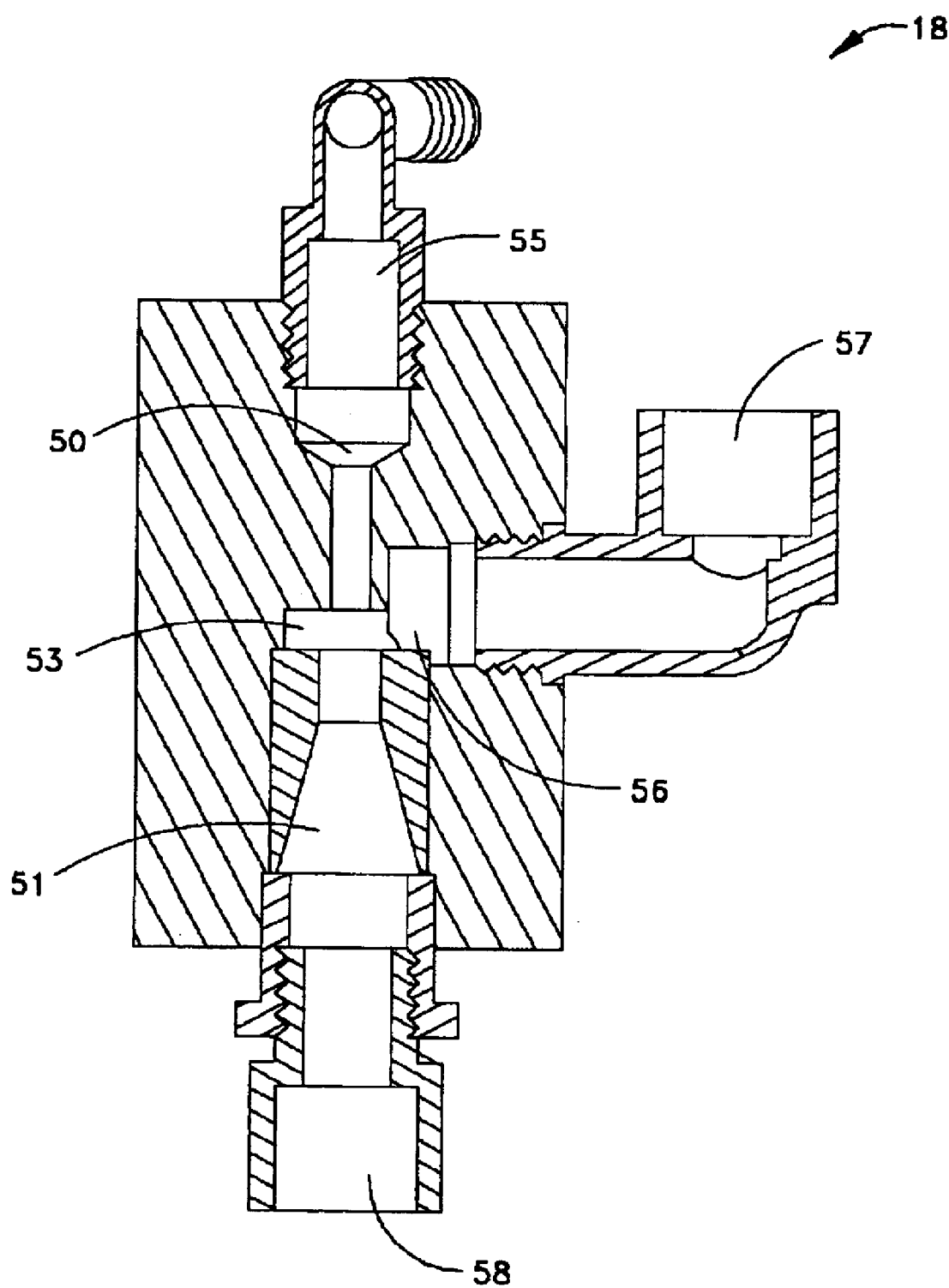
FIG. 1 is a cross-sectional view of a venturi pump used in accordance with the present invention.

Providing the vacuum, or negative pressure, to withdraw mixtures of the coolant and tramp oil from the sump 14 is the venturi pump, or fluid amplifier 18, best shown in FIG. 1. The venturi pump 18 has a first inlet 57, a second inlet 55 and an outlet 58 for passing fluids. In addition, the venturi pump has a first passageway in the form of a converging nozzle 50, essentially, directly in line with a second passageway, in the form of a diverging nozzle 51. Between the two nozzles is a chamber 53 that has a diameter greater than the diameter of the narrowest portion of the converging nozzle 50. As can be seen from FIG. 1, the velocity of a fluid entering the converging nozzle 50 through the second inlet 55 will increase as it passes through the narrowest portion of the converging nozzle 50 prior to entering the chamber 53. Conversely, as the fluid continues through the chamber 53 and enters the diverging nozzle 51, its velocity will decrease. This change in velocities results in a negative pressure, or vacuum, being established in a chamber 56. The chamber 56 is in fluid communication with the inlet 57 in the side of the venturi pump so that the vacuum created in the chamber 56 will cause any fluid that is in fluid communication with the first inlet 57 to be drawn into the chamber 53 where it joins with the fluid that is being conveyed from inlet 55 to outlet 58 through the nozzles 50 and 51. The fluids, after joining, exit the venturi pump 18 through the outlet 58. According to the invention, as best shown in FIG. 2, the second inlet 55 is connected to a pumping means 24 by means of a second fluid conductor 60, the outlet 58 is connected to the separator 22 through a conduit 68, and the first inlet 57 is connected to the skimmer 46 through the first fluid conductor 32 and flanged sleeve 36.

In operation, coolant from near the bottom of tank 26 is pumped by the pumping means 24, which, preferably, is a conventional immersible centrifugal pump. Pumping means 24 pumps the coolant, with which it is in liquid communication, from an outlet in the pumping means to which one end of the second fluid conductor 60 is connected. The coolant is pumped through conduit fluid conductor 60 into the second inlet 55 of the venturi pump 18 to which the other end of fluid conductor 60 is connected. The coolant first passes through the converging nozzle 50, and, thereafter, through chamber 53 and the diverging nozzle 51 and exits the venturi pump through the outlet 58. The vacuum, or negative pressure, that is created in chambers 53 and 56 by the configurations of the passageways, or nozzles, 50 and 51 and is communicated to inlet 57, is sufficient to withdraw coolant mixed with tramp oil from the skimmer 46 in the sump 14 through the fluid conductor 32 and the sleeve 36. The coolant mixed with tramp oil from the sump 14 combines in the venturi pump 18 with the coolant delivered through the inlet 55 by the pump 24, and the combined coolant and coolant mixed with tramp oil exit the venturi pump at the outlet 58 and proceed to the separator 22 through conduit 68 connected at one end to outlet 58 and connected at its other end to an inlet in the separator.

Although the pump 24 is described above, and shown in FIG. 2, as an submersible pump, other types of pumps may be used, including non-submersible pumps that can be located at the exterior of the tank 26. In that case, the non-submersible pumps would have an intake in fluid communication with the coolant in the lower region of the tank 26. Further, according to another embodiment of the present invention, the venturi pump can be located entirely, or partly, at the exterior of the tank 26.

The separator 22 is a, generally, cylindrical structure comprising a feed cylinder 64 that is positioned, generally, concentrically within an outer coalescing cylinder 66 having a perforated cover 67 at its top. The perforated cover prevents the escape of a coalescing media 74 from the annulus between the coalescing cylinder 66 and the feed cylinder 64 but allows fluids rising through the coalescing media to pass out of the separator. As noted above, fluids exiting the venturi pump 18 pass through the conduit 68 and proceed to an inlet in the feed cylinder 64 of the separator 22 from where the fluids flow downwardly toward the base of the filter near the bottom of the tank 26. The fluids pass through apertures 72 in the feed cylinder 64 adjacent the base of the feed cylinder and flow into the annulus between the cylinders 66 and 64. The fluids then flow upwardly in the annulus. The coalescing media 74 contained within the annulus between the cylinders 66 and 64 cause the tramp oil to be separated from the coolant by the coalescence of the tramp oil on the coalescing media as the fluids pass upwardly through the coalescing media. The coalescing media 74 may be any material on which the tramp oil will coalesce, that has a large surface area and is resistant to damage from both tramp oil and coolant.

As the fluids move upwardly in the annulus between the cylinders 66 and 64, the tramp oil coalesces as droplets on the surface of the coalescing media 74 and the droplets become larger as they merge with one another and come into contact with additional tramp oil until droplets of tramp oil are formed of a size sufficient to allow the droplets to break free from the coalescing media 74. When this occurs, the freed droplets of tramp oil pass upwardly in the annulus and pass through the perforated cover 67 at the top of the coalescing cylinder 66. In the meantime, coolant from which the tramp oil has been separated and coolant that was pumped to the separator from the bottom of the tank 26 through the venturi pump 18 by pump 24 also exit the separator 22 through the perforated cover 67. Upon exiting the separator 22, the reconditioned coolant migrates toward the bottom 42 of the tank 26 and the tramp oil migrates toward the top of the tank 26.

Although the embodiment of the separator 22 described above includes two concentric cylinders 64 and 66, it will be appreciated that these elements may be of any shape, the critical requirement being that adequate contact surface is provided by the coalescing media 74 between the two elements so that the tramp oil will efficiently and effectively coalesce on the coalescing media. Further, although the separator 22 is shown in FIG. 2 as being located within the tank 26, it may be located outside the tank. In that case, the coolant and the tramp oil exiting the separator through the perforated cap 67 would be captured and directed in a suitable manner to the tank 26.

The embodiment of the invention described is but an example, and the scope of the invention is not limited thereto. Rather, the scope of the invention is defined by the claims set forth below.

What is claimed:

1. A liquid conditioning system including a separator for separating a mixture of first and second liquids that, essentially, are not soluble in one another, the separator having an inlet for receiving fluids, a holding tank in fluid communication with the separator for receiving and holding the separated first and second liquids from the separator whereby, because of the difference in their specific gravities, the second liquid collects in the holding tank above the first liquid, a sump for collecting mixtures of the first and second liquids, the sump having an outlet for passing the mixtures of the first and second liquids from the sump, a venturi pump having first and second inlets and an outlet for passing fluids, a first fluid conductor connected at one end to the first inlet in the venturi pump and connected at its other end to the outlet of the sump for conveying to the venturi pump from the sump mixtures of the first and second liquids, a conduit connected at one end to the outlet of the venturi pump and connected at the other end to the inlet at the separator for conveying to the separator fluids exiting the venturi pump, a pumping means in fluid communication with one of the first and second liquids in the holding tank for pumping the liquid with which it is in fluid communication, the pumping means having an outlet for passing fluids, a second fluid conductor connected at one end to the second inlet of the venturi pump and connected at the other end to the outlet of the pumping means for conveying to the venturi pump the liquid pumped by the pumping means, passageways within the venturi pump for conveying from the second inlet of the venturi pump to the outlet of the venturi pump liquid pumped by the pumping means to the venturi pump, the passageways being in fluid communication with the first inlet in the venturi pump and having configurations such as to establish a negative pressure in the first inlet of the venturi pump when the liquid pumped by the pumping means to the second inlet of the venturi pump passes from the second inlet of the venturi pump to the outlet of the venturi pump, whereby mixtures of the first and second liquids in the sump are drawn from the sump through the first fluid conductor into the venturi pump through the first inlet and passed to the separator along with the liquid pumped by the pumping means.

2. The liquid conditioning system of claim 1 wherein the pumping means is in liquid communication with the first liquid.

3. The liquid conditioning system of claim 2 including an outlet in the holding tank, a conduit for conveying the first liquid to the outlet, and a return fluid conductor connected at one end to the outlet in the holding tank and having its other end disposed at the sump for returning the first liquid to the sump.

4. The liquid conditioning system of claim 3 wherein the separator is located within the holding tank.

5. The liquid conditioning system of claim 4 wherein the pumping means and the venturi pump are located within the holding tank.

* * * * *